United States Patent
Balasubramanian et al.

(10) Patent No.: US 11,176,486 B2
(45) Date of Patent: Nov. 16, 2021

(54) BUILDING AND MATCHING ELECTRONIC STANDARDS PROFILES USING MACHINE LEARNING

(71) Applicant: International Business Machines Corporation, Armonk, NY (US)

(72) Inventors: Swaminathan Balasubramanian, Troy, MI (US); Avijit Chatterjee, White Plains, NY (US); Rajiv Joshi, Yorktown Heights, NY (US); John J. Thomas, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 15/857,103

(22) Filed: Dec. 28, 2017

(65) Prior Publication Data

US 2019/0205793 A1    Jul. 4, 2019

(51) Int. Cl.
*G06F 16/248*    (2019.01)
*G06F 16/583*    (2019.01)
(Continued)

(52) U.S. Cl.
CPC .............. *G06N 20/00* (2019.01); *G06F 7/08* (2013.01); *G06F 16/248* (2019.01); *G06F 16/2455* (2019.01); *G06F 16/5854* (2019.01)

(58) Field of Classification Search
None
See application file for complete search history.

(56) References Cited

U.S. PATENT DOCUMENTS 8,135,800 B1    3/2012  Walsh et al.
8,452,658 B2    5/2013  Urbanski
(Continued)

FOREIGN PATENT DOCUMENTS

WO    2013039922 A1    3/2013

OTHER PUBLICATIONS

F. Esposito, S. Ferilli, T. M.A. Basile and N. Di Mauro, "Automatic content-based indexing of digital documents through intelligent processing techniques," Second International Conference on Document Image Analysis for Libraries (DIAL'06), 2006, pp. 16 pp.-219, doi: 10.1109/DIAL.2006.5.

(Continued)

*Primary Examiner* — Ariel Mercado
(74) *Attorney, Agent, or Firm* — Patterson + Sheridan, LLP

(57) ABSTRACT

Method and apparatus for generating profiles using machine learning and influencing online interactions are provided. The methods include generating a user profile specifying a plurality of attribute values for a plurality of principle attributes, by processing a corpus of electronic documents using a first trained machine learning model. In an embodiment, the method further comprises generating a provider profile specifying a plurality of attribute values for the plurality of principle attributes, for each of a plurality of providers, by processing a respective corpus of electronic documents associated with each respective provider using a second trained machine learning model. A plurality of match coefficients based on comparing the user profile and the plurality of provider profiles are determined. Finally, one or more online interactions between the user and the target provider are influenced based on the determined match coefficients.

20 Claims, 7 Drawing Sheets

(51) Int. Cl.
  *G06N 20/00* (2019.01)
  *G06F 7/08* (2006.01)
  *G06F 16/2455* (2019.01)

(56) References Cited

U.S. PATENT DOCUMENTS

| | | | |
|---|---|---|---|
| 8,521,688 | B1 | 8/2013 | Belwadi et al. |
| 8,645,224 | B2 | 2/2014 | Engle |
| 9,129,311 | B2 | 9/2015 | Schoen et al. |
| 9,378,065 | B2 | 6/2016 | Shear et al. |
| 9,405,825 | B1 | 8/2016 | Kuznetsova et al. |
| 10,296,873 | B1 | 5/2019 | Balasia et al. |
| 10,475,100 | B1 | 11/2019 | Herz et al. |
| 2003/0018487 | A1 | 1/2003 | Young et al. |
| 2007/0078851 | A1 | 4/2007 | Grell et al. |
| 2009/0234784 | A1* | 9/2009 | Buriano ............... G06F 16/583 706/12 |
| 2010/0211411 | A1 | 8/2010 | Hudson |
| 2010/0228582 | A1 | 9/2010 | King et al. |
| 2011/0225048 | A1 | 9/2011 | Nair |
| 2014/0114741 | A1 | 4/2014 | Genc-Kaya et al. |
| 2014/0304189 | A1 | 10/2014 | Sullivan, IV et al. |
| 2014/0351092 | A1* | 11/2014 | Burkhart ............ G06Q 30/0282 705/26.62 |
| 2015/0006280 | A1 | 1/2015 | Ruiz et al. |
| 2015/0254675 | A1* | 9/2015 | Kannan .................. G06Q 30/02 705/304 |
| 2016/0171584 | A1* | 6/2016 | Cao ....................... G06F 16/951 705/26.62 |
| 2016/0232546 | A1 | 8/2016 | Ranft et al. |
| 2016/0249791 | A1 | 9/2016 | Viebach et al. |
| 2016/0253710 | A1 | 9/2016 | Publicover et al. |
| 2018/0165062 | A1* | 6/2018 | Yoo ......................... G06F 3/167 |
| 2018/0211333 | A1 | 7/2018 | Lackman et al. |
| 2019/0180095 | A1 | 6/2019 | Ferguson et al. |
| 2020/0067861 | A1 | 2/2020 | Leddy et al. |
| 2020/0097679 | A1* | 3/2020 | Fisse ................... G06F 21/6254 |

OTHER PUBLICATIONS

"List of IBM Patents or Patent Applications Treated As Related," for U.S. Appl. No. 15/856,883, filed Dec. 28, 2017.
ip.com No. IPCOMO00195935D, Anonymous, May 24, 2010, "A mechanism to dynamically push advertisement according to user's interest".

* cited by examiner

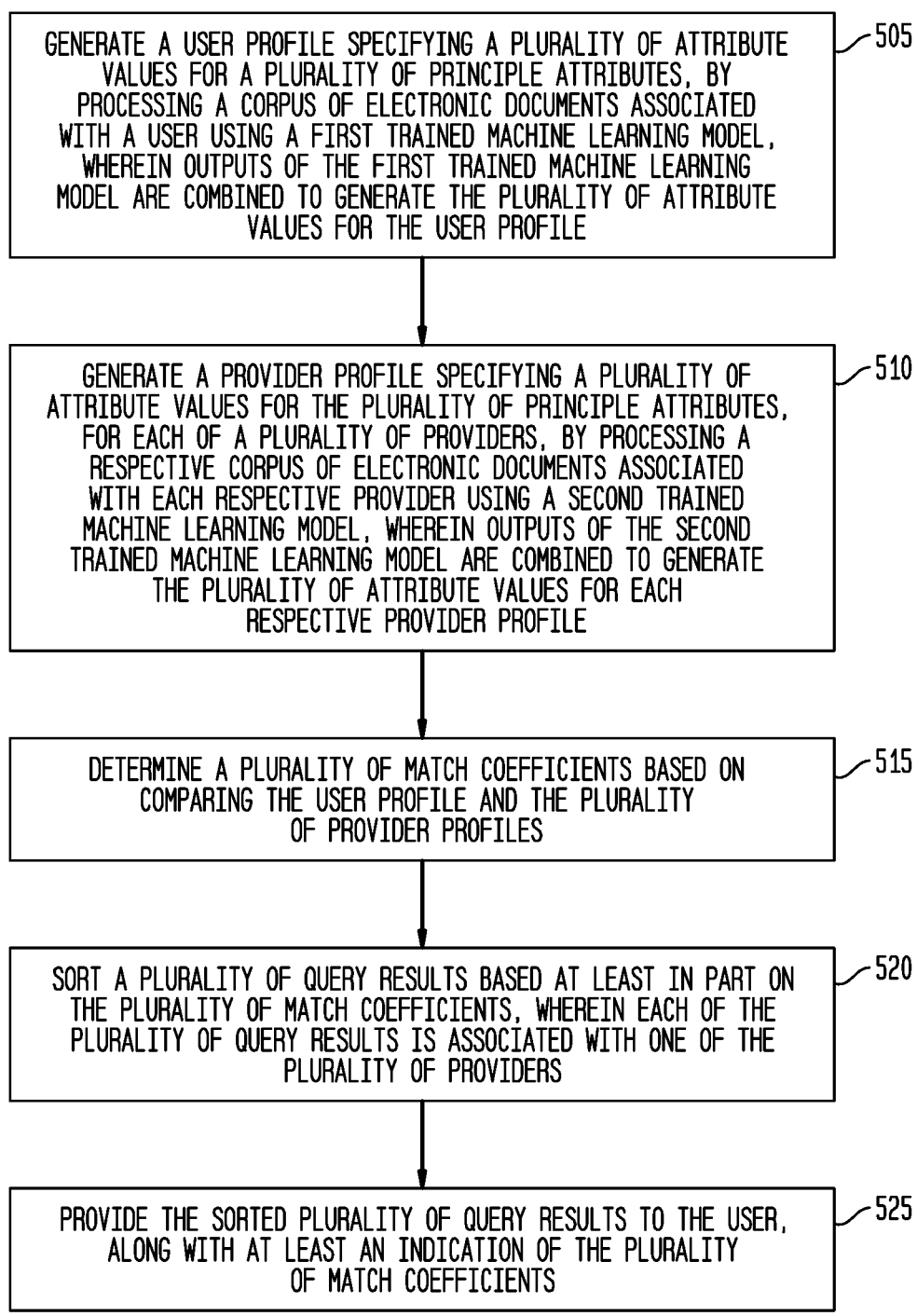

FIG. 6

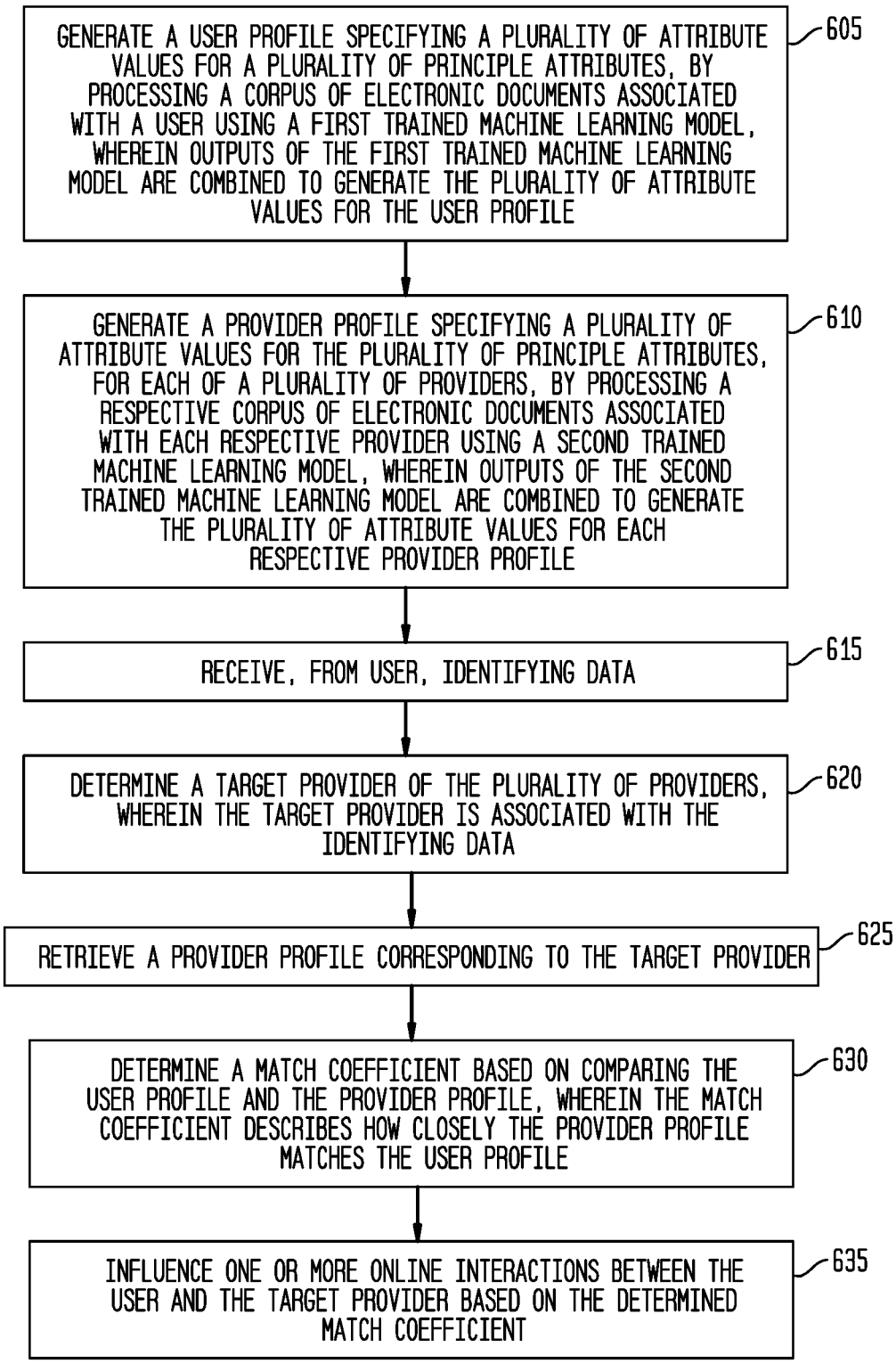

- 605: GENERATE A USER PROFILE SPECIFYING A PLURALITY OF ATTRIBUTE VALUES FOR A PLURALITY OF PRINCIPLE ATTRIBUTES, BY PROCESSING A CORPUS OF ELECTRONIC DOCUMENTS ASSOCIATED WITH A USER USING A FIRST TRAINED MACHINE LEARNING MODEL, WHEREIN OUTPUTS OF THE FIRST TRAINED MACHINE LEARNING MODEL ARE COMBINED TO GENERATE THE PLURALITY OF ATTRIBUTE VALUES FOR THE USER PROFILE

- 610: GENERATE A PROVIDER PROFILE SPECIFYING A PLURALITY OF ATTRIBUTE VALUES FOR THE PLURALITY OF PRINCIPLE ATTRIBUTES, FOR EACH OF A PLURALITY OF PROVIDERS, BY PROCESSING A RESPECTIVE CORPUS OF ELECTRONIC DOCUMENTS ASSOCIATED WITH EACH RESPECTIVE PROVIDER USING A SECOND TRAINED MACHINE LEARNING MODEL, WHEREIN OUTPUTS OF THE SECOND TRAINED MACHINE LEARNING MODEL ARE COMBINED TO GENERATE THE PLURALITY OF ATTRIBUTE VALUES FOR EACH RESPECTIVE PROVIDER PROFILE

- 615: RECEIVE, FROM USER, IDENTIFYING DATA

- 620: DETERMINE A TARGET PROVIDER OF THE PLURALITY OF PROVIDERS, WHEREIN THE TARGET PROVIDER IS ASSOCIATED WITH THE IDENTIFYING DATA

- 625: RETRIEVE A PROVIDER PROFILE CORRESPONDING TO THE TARGET PROVIDER

- 630: DETERMINE A MATCH COEFFICIENT BASED ON COMPARING THE USER PROFILE AND THE PROVIDER PROFILE, WHEREIN THE MATCH COEFFICIENT DESCRIBES HOW CLOSELY THE PROVIDER PROFILE MATCHES THE USER PROFILE

- 635: INFLUENCE ONE OR MORE ONLINE INTERACTIONS BETWEEN THE USER AND THE TARGET PROVIDER BASED ON THE DETERMINED MATCH COEFFICIENT

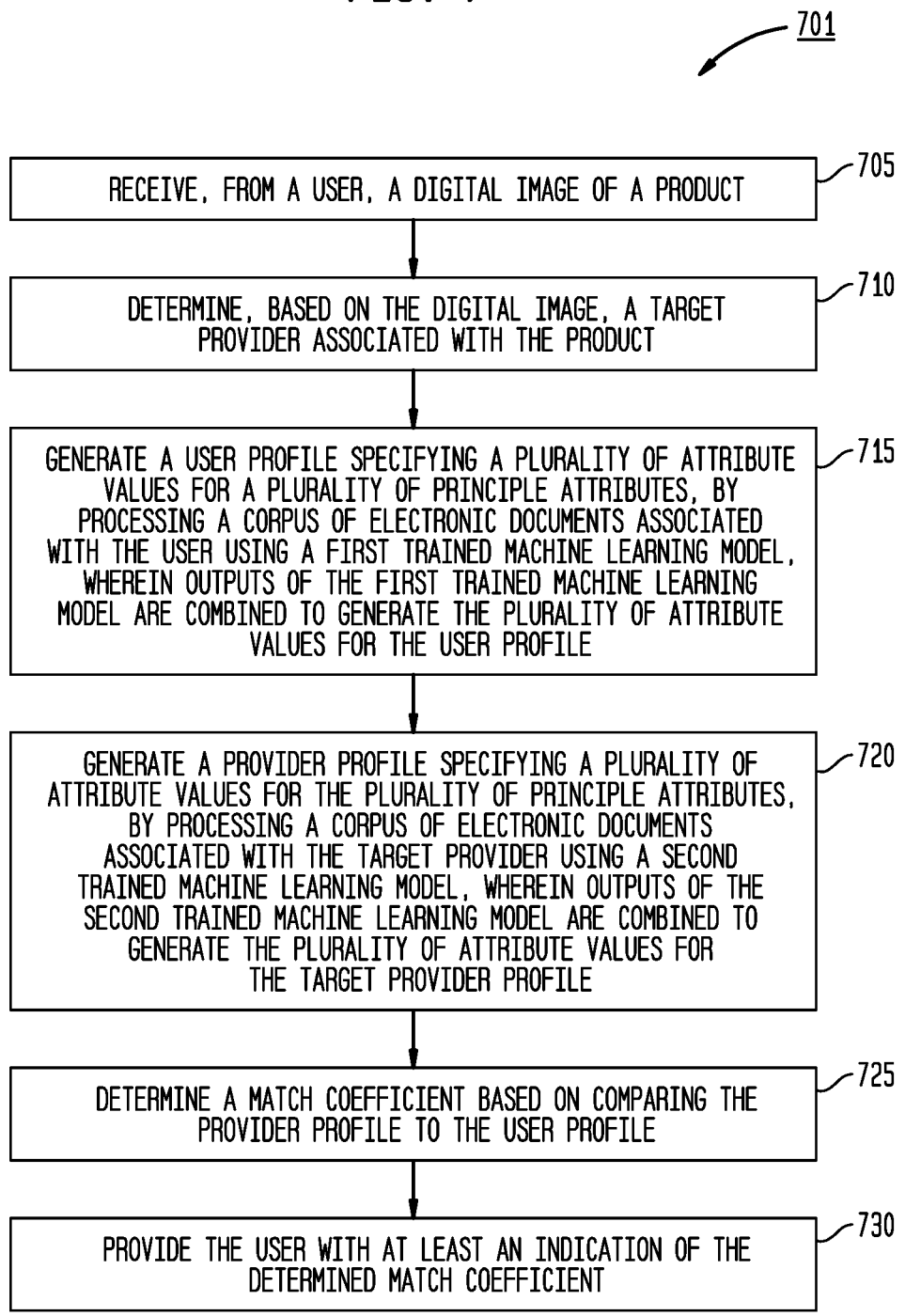

BUILDING AND MATCHING ELECTRONIC STANDARDS PROFILES USING MACHINE LEARNING

BACKGROUND

The present invention relates to machine learning, and more specifically, to using machine learning to generate standards profiles for users and providers.

Individuals can conveniently shop online for a wide variety of products and services, from a tremendous number of organizations. With the ever-growing number of organizations that can be reached, along with the overwhelming number of choices for any given product or service, it is difficult for consumers to know anything about the company they are doing business with. Many people, however, do not wish to do business with an organization whose principles do not align with their own. Several attempts have been made to provide improved data about companies to consumers, but none provide a seamless way to find providers that match your own beliefs. Some attempts have included lengthy self-assessments, but these are time-consuming and prone to inaccuracy, as there is no verification involved. There is a need for customers to receive improved information about businesses.

SUMMARY

One embodiment described herein provides a system that includes a processor and a computer memory storing a program, which, when executed on the processor, performs an operation. The operation includes generating a user profile specifying a plurality of attribute values for a plurality of principle attributes, by processing a corpus of electronic documents associated with a user using a first trained machine learning model, where outputs of the first trained machine learning model are combined to generate the plurality of attribute values for the user profile. The operation further includes generating a provider profile specifying a plurality of attribute values for the plurality of principle attributes, for each of a plurality of providers, by processing a respective corpus of electronic documents associated with each respective provider using a second trained machine learning model, where outputs of the second trained machine learning model are combined to generate the plurality of attribute values for each respective provider profile. A plurality of match coefficients are determined based on comparing the user profile and the plurality of provider profiles. Finally, the operation includes sorting a plurality of query results based at least in part on the plurality of match coefficients, where each of the plurality of query results is associated with one of the plurality of providers, and the sorted plurality of query results are provided to the user along with at least an indication of the plurality of match coefficients.

A second embodiment described herein provides a computer program product having computer-readable program code embodied therewith. The computer-readable program code, when executed on a processor, performs an operation including generating a user profile specifying a plurality of attribute values for a plurality of principle attributes, by processing a corpus of electronic documents associated with a user using a first trained machine learning model, where outputs of the first trained machine learning model are combined to generate the plurality of attribute values for the user profile. Further, the operation includes generating a provider profile specifying a plurality of attribute values for the plurality of principle attributes, for each of a plurality of providers, by processing a respective corpus of electronic documents associated with each respective provider using a second trained machine learning model, where outputs of the second trained machine learning model are combined to generate the plurality of attribute values for each respective provider profile. Further, the operation includes receiving identifying data from the user, and a target provider of the plurality of providers is determined, where the target provider is associated with the identifying data. A provider profile corresponding to the target provider is retrieved. Finally, a match coefficient is determined based on comparing the user profile and the provider profile, where the match coefficient describes how closely the provider profile matches the user profile, and the match coefficient is presented to the user.

A third embodiment described herein provides a method. The method includes receiving, from a user, a digital image of a product. The method also includes determining, based on the digital image, a target provider associated with the product. A user profile specifying a plurality of attribute values for a plurality of principle attributes is generated, by processing a corpus of electronic documents associated with the user using a first trained machine learning model, where outputs of the first trained machine learning model are combined to generate the plurality of attribute values for the user profile. The method further includes generating a provider profile specifying a plurality of attribute values for the plurality of principle attributes, by processing a corpus of electronic documents associated with the target provider using a second trained machine learning model, where outputs of the second trained machine learning model are combined to generate the plurality of attribute values for the target provider profile. A match coefficient is determined based on comparing the provider profile to the user profile. Finally, the method includes providing the user with at least an indication of the determined match coefficient.

Other embodiments include, without limitation, a computer-readable medium that includes instructions that enable a processing unit to implement one or more aspects of the disclosed methods, as well as a system having a processor, memory, and application programs configured to implement one or more aspects of the disclosed methods.

BRIEF DESCRIPTION OF THE SEVERAL VIEWS OF THE DRAWINGS

FIG. 5 illustrates a method for generating and comparing profiles using machine learning, according to one embodiment of the present disclosure.

FIG. 6 illustrates a method for generating and comparing profiles using machine learning, according to one embodiment of the present disclosure.

FIG. 7 illustrates a method for generating and comparing profiles using machine learning, according to one embodiment of the present disclosure.

DETAILED DESCRIPTION

People generally want to avoid doing business with companies and organizations that offend their principles. To that end, embodiments of the present disclosure provide for utilizing supervised machine learning techniques to generate and maintain a set of opinion profiles for users and providers, as well as methods for evaluating those profiles and influencing online interactions. This allows for an objective system that is not dependent on self-assessment or potentially biased verifications and provides a seamless and convenient platform for interactions among entities.

Figure 1:
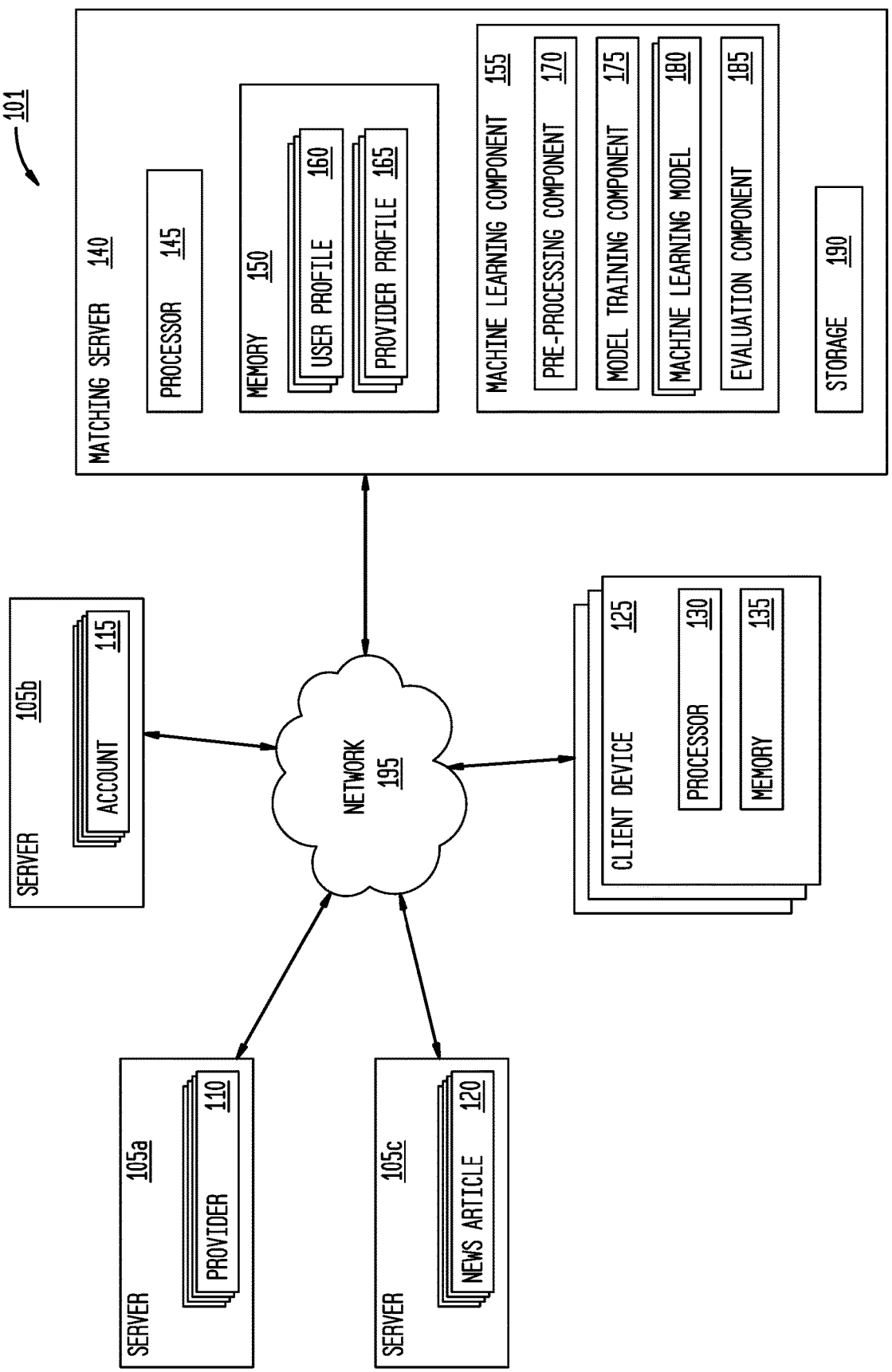
FIG. 1 illustrates an example computing environment, according to one embodiment of the present disclosure.

With reference now to FIG. 1, an example computing environment 101 is provided. The illustrated embodiment includes a plurality of Servers 105a, 105b, and 105c. The environment also includes a plurality of Client Devices 125 and a Matching Server 140. Each of the Servers 105a, 105b, and 105c, as well as Client Devices 125 and Matching Server 140 may communicate with each other and with other devices using Network 195. Network 195 may be any communications network, and may be wired, wireless, or a combination thereof. Network 195 may be, for example, the Internet. As illustrated, Server 105a includes a plurality of Providers 110.

Environment 101 also includes Server 105b, which comprises data about a plurality of Accounts 115 or users. Server 105b may be, for example, a social media platform that allows its users to maintain Accounts 115. In an embodiment, each Account 115 corresponds to an individual user. Server 105b includes a corpus of information about each Account 115. This information may include pictures, videos, and audio recordings of the respective Account 115. It further includes textual information authored by each user associated with the respective Account 115, such as status updates, blog posts, comments, and the like. The information also includes data about things the user associated with Account 115 has expressed a like or dislike for. In addition, the information may further include not only data authored by the user of Account 115, but also data shared by the Account 115. Although one Server 105b is illustrated, there may of course be many social media servers, each including similar information about its Accounts 115 or users.

The illustrated embodiment further includes a Server 105c comprising News Articles 120. Similarly to the above discussion, there may of course be many different Servers 105c with News Articles 120, although just one is illustrated. For example, there may be a plurality of Servers 105c, each corresponding to a respective news agency. In an embodiment, each News Article 120 may be associated with one or more Providers 110. For example, each News Article 120 may include recent public statements from one or more Providers 110, as well as one or more actions that each Provider 110 has taken. The News Articles 120 may similarly include information about people associated with each Provider 110, such as a CEO, who has made statements or taken actions that the article discusses. For example, News Articles 120 could include an article discussing how a Provider 110 recently opened a factory in China, or that the president of a Provider 110 was overheard commenting about a scandal that involves to another Provider 110. Similarly, News Articles 120 may describe social interactions of one or more Providers 110. In general, News Articles 120 may include any information that relates to one or more Providers 110.

Although not illustrated, the environment 101 may also include a plurality of Servers 105 for each Provider 110. Thus, in addition to being represented on Server 105a, each Provider 110 may also maintain its own server or website in order to distribute information about the respective Provider 110. For example, each Provider 110 may maintain a website containing information like mission statements, visions of the provider, outreach programs, and the like. Similarly, in an embodiment, each Provider 110 may maintain an account on one or more social media websites, such as hosted on Server 105b, similarly to individual users. In such an embodiment, the information maintained by Server 105b would further include data about the social interactions of each Provider 110, such as blog posts, comments, status updates, things the Provider 110 has indicated a like or dislike for, and the like.

Environment 101 also includes a plurality of Client Devices 125. Each Client Device 125 may be, for example, a computer or mobile device containing a Processor 130 and a Memory 135. Although not illustrated, Client Device 125 may also include one or more storage devices, a network interface, and an input/output (I/O) interface for connecting to I/O devices like keyboards, displays, and printers. As illustrated, Processor 130 retrieves and executes programming instructions stored in Memory 135 as well as stores and retrieves application data residing in storage. Processor 130 is representative of a single CPU, multiple CPUs, a single CPU having multiple processing cores, and the like. Memory 135 is generally included to be representative of a random access memory. Storage, if present, may be a disk drive storage device, and may include fixed and/or removable storage devices, such as fixed disk drives, removable memory cards, or optical storage, network attached storage (NAS), or storage area-network (SAN).

A user might use Client Device 125 to, for example, read News Articles 120 from one or more Servers 105c. Similarly, a user may use Client Device 125 to search for Providers 110 on Server 105a, in order to purchase goods or request services. Further, a user can use Client Device 125 to access social media such as Server 105b to maintain his or her account or profile, such as Account 115. For example, a user can use Client Device 125 to create a status update, share articles, upload pictures, videos, and audio, and the like. This data can all be stored for each Account 115.

The illustrated embodiment also includes Matching Server 140. As illustrated, Matching Server 140 includes a Processor 145, Memory 150, Machine Learning Component 155, and Storage 190. Processor 145 retrieves and executes programming instructions stored in Memory 150 as well as stores and retrieves application data residing in storage. Processor 145 is representative of a single CPU, multiple CPUs, a single CPU having multiple processing cores, and the like. Memory 150 is generally included to be representative of a random access memory. Storage 190 may be a disk drive storage device, and may include fixed and/or removable storage devices, such as fixed disk drives, removable memory cards, or optical storage, network attached storage (NAS), or storage area-network (SAN).

In the illustrated embodiment, Machine Learning Component 155 uses machine learning to parse a wide variety of documents to create User Profiles 160 and Provider Profiles 165. In an embodiment, each User Profile 160 corresponds to a respective user. For example, the Machine Learning Component 155 could generate a User Profile 160 for a particular user of a particular Client Device 125, and in doing so, the Machine Learning Component 155 could consider content associated with the Account 115 for the particular user. In some embodiments, Machine Learning Component 155 parses and processes data regarding Accounts 115 in order to create User Profiles 160. Machine Learning Component 155 may do so automatically, e.g., without prompting from the user, for all Accounts 115 that are publically accessible. In some embodiments, however, Machine Learning Component 155 only creates and maintains User Profiles 160 for the users who request it, or who agree to have a User Profile 160 created for them. Further, in some embodiments, a user may be prompted to provide additional data beyond that which is available publically from their Account 115. For example, a user may provide extra permissions to Machine Learning Component 155 to access non-public aspects of Account 115, or the user may upload other data about themselves that is not available at all in Account 115. Additionally, in an embodiment, a User Profile 160 may be created for a user who does not have an Account 115 on social media, but is willing to provide other data about themselves to populate the User Profile 160.

As used herein, an electronic document refers to any electronically-stored textual data. With reference to a User Profile 160, an electronic document may include, for example, posts and comments on social media, blogs authored by the user, articles, posts, and comments the user has expressed a like or dislike for, and the like. Electronic documents also include textual data that is not created by the user, but nevertheless refers to or is associated with the user. For example, an electronic document associated with a user may be textual data about interactions the user has with other users or with Providers 110, as well as information about data that the user consumes. For example, an electronic document may include websites that the user frequents or articles that the user has read, even if they do not create any comments or posts there. Further, electronic documents can include handwritten documents which have been scanned into a computer, as well as papers, essays, articles, and the like that a user has authored. Thus, "electronic documents" broadly refers to any textual data about a user or created by a user.

Additionally, in some embodiments, "electronic documents" includes text transcripts that have been generated using speech-to-text systems with audio or video that includes the user. This transcript includes things that the user said, but in some embodiments also includes things that others said. For example, if a video includes one person talking about politics, and the user simply states "I agree completely," it may be beneficial to include the transcript for the other person in the electronic document. This is similar to how an article that the user expresses a like for or comments on may be included as an electronic document, because it helps provide context to what the user was expressing.

In some embodiments, Machine Learning Component 155 processes data in addition to or instead of electronic documents. In an embodiment, Machine Learning Component 155 is also configured to process various numerical data in order to generate User and Provider Profiles 160 and 165. For example, in an embodiment, the length of time or proportion of time that a user spends browsing content is used to build and refine User Profile 160. The length of time that a user spends browsing specific categories on a Provider 110 website, a shopping website, news sites, television and radio stations, and the like may be used alone to generate User Profile 160, but may similarly be used to weight the associated electronic documents. For example, if a user spends a large amount of time, or a large proportion of their time, browsing news articles about the environment, those news articles may be given greater weight by Machine Learning Component 155.

In some embodiments, Machine Learning Component 155 also considers financial or transactional data associated with a user. For example, in various embodiments, Machine Learning Component 155 also considers which products or services a user has purchased, the quantity purchased, how frequently the product or service is purchased, the total amount spent on the product or service, and the proportion of the user's total spending that the product or service accounts for. This information may be used as standalone input for Machine Learning Component 155, or may be used as weighting information in conjunction with other input. For example, if a user spends a significant amount of money on products from a Provider 110 that conducts animal testing, Machine Learning Component 155 may use that data to directly adjust User Profile 160, or may use the amount spent as weighting information when processing some other information, such as a description of the product.

In an embodiment, each Provider 110 on Server 105*a* is an entity that provides some service or product. For example, each Provider 110 may be a manufacturer or retailer, or may each provide a service such as cloud storage, landscaping, or any other service. That is, the plurality of Providers 110 includes any entity that provides goods or services to customers, whether online or offline, and regardless of whether the goods and services are provided in exchange for monetary compensation or otherwise. In the illustrated embodiment, Server 105*a* allows users to search for goods and services from a variety of online Providers 110. Although not illustrated, there may be providers who are not represented on Server 105*a*. For example, some providers may not sell any goods or services on Server 105*a*, or online at all. Nevertheless, the embodiments discussed herein may be applied to these offline providers as well.

Similarly to the User Profiles 160, each Provider Profile 165 may correspond to a particular Provider 110, such as those found within Server 105*a*. Of course, the embodiment may also include Provider Profiles 165 that correspond to providers who exist in the real world but do not correspond to any Provider 110 found on Server 105*a*. For example, some of the Provider Profiles 165 correspond to providers of goods and services which can be found on Server 105*a*, while some of the Provider Profiles 165 correspond to local business or providers of goods and services that cannot be found on Server 105*a*. In an embodiment, Machine Learning Component 155 may automatically create a Provider Profile 165 for each Provider 110. In an embodiment, Matching Server 140 may also be configured to receive requests to create or update a Provider Profile 165, e.g., from a user or from the respective provider. For example, a user may notice that a local provider does not have a Provider Profile 165, or that the Provider Profile 165 is outdated, and may request that Machine Learning Component 155 create or update one.

With reference to Provider Profiles 165, "electronic documents" includes any textual data about or authored by a respective provider of goods and services. For example, electronic documents can include mission statements, visions, public statements, text regarding actions taken by a provider, news articles about the provider, and social interactions of the provider. The "electronic documents" also include statements and actions taken by persons associated with the provider, such as the CEO, president, or other official, and the like. In an embodiment, "electronic documents" also refers to private or internal documents of a provider that are not available to the public. Thus, the "electronic documents" associated with a provider generally includes the same data that could be associated with a user.

Both User Profiles 160 and Provider Profiles 165 generally include a number of attribute values or scores for a number of principles, attributes, or opinions. In an embodiment, the attributes include animals, environment, people, politics, and sustainability. A score for each attribute is determined based on a user or provider's opinions or beliefs regarding the attribute, as will be explained in more detail below. For example, a user's thoughts on animal testing, factory farming, animal cruelty, and the like all influence his or her attribute score in the "animals" dimension. Similarly, a provider's actions or statements regarding environmental reporting, climate change, pollution, habitats, and natural resources will influence the "environment" score in that provider's Provider Profile 165.

Machine Learning Component 155 generally processes a corpus of electronic documents about each user and provider, and creates and maintains User Profiles 160 and Provider Profiles 165. As illustrated, Machine Learning Component 155 includes Pre-Processing Component 170, Model Training Component 175, one or more Machine Learning Models 180, and Evaluation Component 185. Generally, Pre-Processing Component 170 processes electronic documents in order to facilitate there use with Model Training Component 175 and one or more Machine Learning Models 180, as will be discussed in more detail below. Generally, Model Training Component 175 is used to train and update the one or more Machine Learning Models 180, as will be discussed in more detail below. The one or more Machine Learning Models 180 are used to process electronic documents from users and providers and create User Profiles 160 and Provider Profiles 165, as will be discussed in more detail below. Although the one or more Machine Learning Models 180 are illustrated as a part of Machine Learning Component 155, the one or more Machine Learning Models 180 may be embodied in Memory 150, Storage 190, a combination thereof, or any other location capable of performing embodiments of the present disclosure. Finally, Evaluation Component 185 is generally used to compare and evaluate User Profiles 160 and Provider Profiles 165, as will be discussed in more detail below.

In some embodiments, electronic documents are provided directly to Model Training Component 175 without pre-processing. In other embodiments, however, it is necessary or helpful to pre-process input data in order to facilitate the process. For example, in an embodiment, Pre-Processing Component 170 may process electronic documents to remove "stop words," or common words which do not provide meaning to the document. For example, such words could include "the," "is," "at," and the like. In some embodiments, the removal of stop words can increase the accuracy and efficiency of the one or more Machine Learning Models 180. In a related embodiment, Pre-Processing Component 170 may be configured to remove punctuation from input electronic documents, or other portions of an electronic document that are not useful for the present disclosure, such as metadata associated with the document. In some embodiments, however, metadata is retained for processing by Model Training Component 175. In an embodiment, Pre-Processing Component 170 is configured to perform speech-to-text functionality. For example, in order to facilitate the use of audio or video input to the Machine Learning Component 155.

In some embodiments, Pre-Processing Component 170 generates a feature vector for each of the electronic documents. In this embodiment, a feature vector is a vector having any number of dimensions which represents a numerical representation of the associated electronic document. In some embodiments, this vectorization of electronic documents may improve the speed, efficiency, and/or accuracy of the system. In some embodiments, the vectorization of the electronic documents is required for the Machine Learning Component 155 to process the input and generate User and Provider Profiles 160 and 165.

In some embodiments, Pre-Processing Component 170 may associate weights with input electronic documents. In other embodiments, weights may be assigned by Model Training Component 170, or by another component not illustrated in FIG. 1. In some embodiments, the electronic documents are not associated with any weighting at all. In embodiments that include weighting, the weights may be based on, for example, the source of a document. For example, an electronic document retrieved from a news source may be given more weight by Model Training Component 175 than an electronic document that was retrieved from the provider itself, e.g., through its own website. Similarly, an electronic document from a first news source may be assigned a greater weight than an electronic document from another, less reliable news source. In another embodiment, the weighting is based on the type of electronic document. For example, a blog post associated with an Account 115 may be given more weight than a comment that is posted by the user of the Account 115.

Further, in some embodiments, the associated weight may depend in part on whether the electronic document was authored by the respective user or provider, or by another entity. For example, an article written by the user may be assigned a higher weight than an article written by another person that the user commented on or expressed a like for. In various embodiments, the weight associated with each electronic document can be based on any number of factors, including the size of the document, the format of the document, the author of the document, and the like.

Model Training Component 175 generally takes as input a set of electronic documents and a set of corresponding labels or attribute values, and generates one or more Machine Learning Models 180 which can be used to classify new electronic documents according to a number of dimensions or principle attributes. For example, as discussed above, the attributes may include "animals," "environment," "people," "politics," and "sustainability." In an embodiment, several concepts can be included within each attribute, to facilitate generation of the profiles and prevent creation of an excessive number of dimensions. For example, attitudes regarding animal testing, factory farming, and animal rights and cruelty may all be included within an "animals" attribute. In some embodiments, however, it may be preferable to enable a distinct attribute score for each of these "sub-attributes," in order to obtain a more perfect representation of the individual user or provider. Other examples of "sub-attributes" include opinions environmental reporting, climate change, pollution, habitats, and natural resources all coming under a broader "environment" category. Similarly, a "people" attribute can be sub-divided into beliefs regarding human and workers' rights, marketing, and the like. A "politics" attribute may include information about boycotts, political activity, controversial stances or technologies, and the like. Of course, these examples are merely illustrative and are not intended to limit the present disclosure in any way.

In an embodiment, the attribute value or score is a numerical indication of how "ethical" the particular user or provider is with respect to that attribute. For example, the attribute value may range from −1 indicating totally unethical to +1 indicating totally ethical, with a score of 0 indicating ambivalence or neutrality. In some embodiments, the attribute score ranges from 0 to 100, or from 0 to 10, or any other range. In some embodiments, the attribute value or score is represented by a rating scale such as a Likert scale with any number of categories (typically five seven, or nine). For example, each attribute value could indicate how ethical a user or provider is for each attribute, ranging from "not at all ethical" to "extremely ethical," with any number of options in between.

In the illustrated embodiment, Model Training Component 175 is provided with a set of electronic documents and a corresponding set of attribute values. Thus, when generating or updating a Machine Learning Model 180 for use with user data, an administrator may provide the Model Training Component 175 with electronic documents relating to users and a label or attribute value for each document. For example, the administrator may provide as input blog posts, social media updates, and the like, as discussed above, along with an attribute score for each document. This attribute score may be determined, for example, by the administrator. In some embodiments, the attribute values for the initial training exemplars may be determined by vote. For example, a particular electronic document may be presented, and one or more people may score it along the various principle dimensions, with the ultimate score provided to the Model Training Component 175 being determined at least in part on the aggregate votes. While processing the documents and the associated attribute values, Model Training Component 175 creates and updates the respective Machine Learning Model 180. After training is complete, the Machine Learning Model 180 can receive as input a new electronic document that it has never seen before, and score it along the various attributes in order to determine the opinions, principles, beliefs, and ethics of the author or subject matter.

In some embodiments, there are multiple distinct Machine Learning Models 180 for various types of users and providers. For example, there may be one Machine Learning Model 180 which is used to process user data, and a separate Machine Learning Model 180 that is used to process providers' data. Similarly, users and providers may be further subdivided. For example, in some embodiments there is one Machine Learning Model 180 for providers of goods, and a separate Machine Learning Model for providers of services. There may similarly be various Machine Learning Models 180 for users of various ages, languages, or demographics, and distinct Machine Learning Models 180 for providers of varying size and location. Model Training Component 175 can create these various types of Machine Learning Models 180 by using the electronic documents associated with the different categories of users or providers to generate the respective Machine Learning Model 180, and not including data from other categories.

In some embodiments, the Model Training Component 175 is used to generate the Machine Learning Models 180, and then is switched off. In such an embodiment, the models remain static. In some embodiments, however, the Model Training Component 175 may periodically be provided with additional training exemplars, in order to update the Machine Learning Models 180 to reflect changes in population or beliefs, or changes in the way information is shared. Similarly, in some embodiments, new attributes or dimensions may be created as will be discussed in more detail below. In such an embodiment, the Model Training Component 175 will be used to process training documents for the new attribute, in order to update the Machine Learning Models 180.

In some embodiments, new attributes can be added to the list of attributes that make up the User and Provider Profiles 160 and 165, and old attributes may be removed. In one embodiment, an administrator or other person can manually add and remove attributes based on changing technologies, beliefs, concerns, and the like. For example, if intelligent alien life were discovered, an administrator may want to add a new attribute reflecting a user or provider's opinions and beliefs regarding the newly discovered alien life, because the new concern does not fit into one of the existing attribute categories. Similarly, if an existing category is no longer relevant, the administrator may remove it. In some embodiments, an unsupervised machine learning model can be used to detect emerging trends and dimensions. For example, the system could use clustering, anomaly detection, or other unsupervised machine learning methods to determine that a new attribute should be included, or that an existing attribute should be removed. In some embodiments, this unsupervised machine learning may be active for a period of time, and then deactivated at a later point once the system and models have matured. In other embodiments, however, the unsupervised machine learning may remain active.

In an embodiment, Pre-Processing Component 170 is used to pre-process input electronic documents that are processed by an unsupervised machine learning model, in much the same way as input is processed prior to being provided to Model Training Component 175. For example, such pre-processing can include associating weights with input documents, converting documents to feature vectors, removing stop words, punctuation, and other unnecessary elements, and the like. Similarly, in an embodiment, Pre-Processing Component 170 is used to pre-process input electronic documents that are to be processed using Machine Learning Model 180, in much the same way as input is processed prior to being provided to Model Training Component 175. For example, such pre-processing can include associating weights with input documents, converting documents to feature vectors, removing stop words, punctuation, and other unnecessary elements, and the like.

Evaluation Component 185 is generally used to aggregate the output of the Machine Learning Model 180 into User and Provider Profiles 160 and 165, as well as to compare and match the profiles. For example, a user's blog post may be processed using Machine Learning Model 180, which results in a plurality of attribute scores. These scores are incorporated into that particular user's User Profile 160 by Evaluation Component 185, in order to ensure that the User Profile 160 is up to date. A similar process is implemented for Provider Profiles 165. In an embodiment, the User and Provider Profiles 160 and 165 are updated every time a new electronic document associated with the particular user or provider is provided as input. In other embodiments, the profiles are updated after a predefined period of time or upon some other triggering event. Additionally, while in some embodiments Evaluation Component 185 aggregates attribute values provided by Machine Learning Model 180, in other embodiments, Machine Learning Model 180 itself aggregates the scores from a corpus of documents, and creates or updates the User and Provider Profiles 160 and 165.

Evaluation Component 185 is also configured to compare User Profiles 160 and Provider Profiles 165 in order to determine matching scores. For example, if a user has a particularly high attribute value in one dimension, but a provider has a particularly low score in that dimension, the Evaluation Component 185 may determine that the user and provider have a low matching coefficient. In an embodiment, Evaluation Component 185 considers all of the attributes when generating matching scores for a given User Profile 160 and Provider Profile 165 pairing. Thus, even if a user and provider have drastically different attribute values for one attribute, they may nevertheless have a fairly high matching score if they closely align on other attributes. In some embodiments, the user may specify a weight to assign each attribute by Evaluation Component 185. For example, a user may be significantly concerned with being environmentally friendly, but not particularly concerned about animal rights. In such an embodiment, the matching component may weigh the environmental attributes of the User Profile 160 and Provider Profiles 165 more heavily than the animal attribute.

Additionally, in some embodiments, Machine Learning Component 155 may itself determine weights for each attribute, based on a variety of factors. For example, if a large portion of a the electronic documents associated with a user are focused on only one attribute, Machine Learning Component 155 may determine that the particular attribute is very important to the user, and may give that attribute additional weight when generating matching scores. Accordingly, the weighting information may change over time as the input documents change to reflect the user's changing attitudes.

In some embodiments, Evaluation Component 185 may generate a numerical matching score, e.g., out of 100. In other embodiments, Evaluation Component 185 generates an N-dimensional vector matching score for N attributes, e.g., with a different score for each attribute. In other embodiments, however, Evaluation Component 185 is configured to generate a Boolean response: Match/No Match, for example based on a predefined threshold. This predefined threshold could be set by the user. In some embodiments, Evaluation Component 185 is configured to generate matching scores based on the difference between the User Profile 160 and Provider Profile 165 for each attribute. In some embodiments, however, only certain differences may be material, e.g., where the difference between the user's attribute value and the provider's attribute value exceeds a predefined threshold. For example, if a User Profile 160 has a score of 0.3 for one attribute, and the Provider Profile 165 has a score of 0.5 for that attribute, Evaluation Component 185 may determine that this difference is below the predefined threshold, and thus should not affect the matching score.

In a related embodiment, Evaluation Component 185 is configured to generate matching scores in which a provider is not penalized for having a higher score than the user for a particular ethical attribute. For example, if a user has an "animal" score of 0.6, Evaluation Component 185 may determine that a provider with an "animal" score equal to or greater than 0.6 is a perfect (or near-perfect) match. In this embodiment, a user/provider pair would not receive a lower matching score because the provider is more ethical than the user. Instead, the Evaluation Component 185 can generate a very high matching score. In some embodiments, the match score may be generated in such a way as to consider the magnitude of the differences in each dimension individually, in addition to or instead of aggregating the differences. Consider an example where a User Profile 160 has scores of {0.4, 0.5, and 0.6} for the first three attributes, and a Provider Profile 165 has scores of {0.3, 0.4, and 0.4}. There is an aggregate difference of 0.4 between the two profiles, but they are still fairly closely matched. If the Provider Profile 165 was instead scored {−0.2, 0.5, and 0.6}, the aggregate difference is still just 0.5, but there is not as close a match, as evidenced by the large difference in the first attribute values. Thus, in an embodiment, Evaluation Component 185 may consider whether any particular attribute is very badly matched, in addition to or instead of considering the aggregate principle attribute values.

Figure 2:
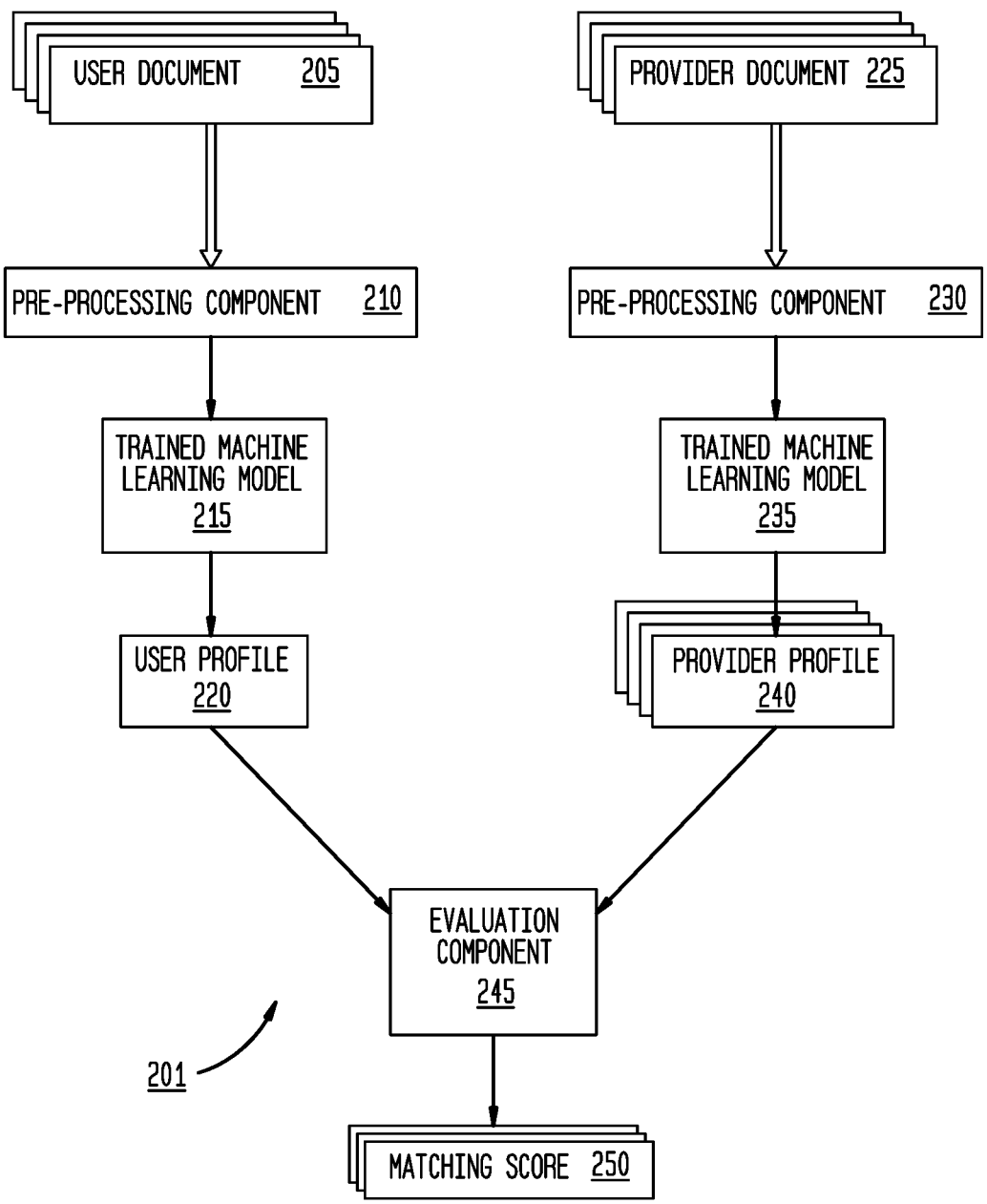
FIG. 2 illustrates an example of generating and comparing profiles using machine learning, according to one embodiment of the present disclosure.

Turning to FIG. 2, an example flow 201 for generating User and Provider Profiles 220 and 240 is illustrated, as well as for evaluating the profiles. In the illustrated embodiment, User Documents 205 are first provided to a Pre-Processing Component 210. In the illustrated embodiment, User Documents 205 may be any electronic document that is associated with a user, as discussed above. Similarly, Provider Documents 225 are provided to a Pre-Processing Component 230 to ready them for processing using the machine learning model. As illustrated, the output of Pre-Processing Model 210 is provided to Trained Machine Learning Model 215, which processes the User Documents 205 to generate or update a User Profile 220 for the particular user. Similarly, the processed output of Pre-Processing Component 230 is provided to Trained Machine Learning Model 235, which processes the Provider Documents 225 to generate or update a plurality of Provider Profiles 240. Next, Evaluation Component 245 compares and evaluates the User Profile 220 and Provider Profiles 240, and generates a plurality of Matching Scores 250, one for each provider.

The Matching Scores 250 can be used in a variety of ways to influence interactions between the user and each provider. In some embodiments, the Matching Scores 250 are generated responsive to a request from a user. In such an embodiment, a user may submit a search query for a particular good or service, which may trigger the generation of Matching Scores 250. For example, a user may initiate a search query at a retail website specifying a particular type of dress the user wishes to purchase. In such an embodiment, a web application server could determine a list of products matching the search query and identify the various providers of the matching products or services. The Evaluation Component 185 could determine Matching Scores 250 for the user and the various providers of the products and services in the query results, and the web application server could then use the Matching Scores 250 to sort the query results, such that products or services from providers that more closely match the user are nearer the top. In some embodiments, Matching Scores 250 are not the only factor considered when searching the results. For example, other factors like how closely the query matches the result, how expensive the result is, how far away the provider is, and the like may also be considered when sorting the results. In some embodiments, one or more providers may be filtered out of the list, based on determining that the associated Matching Score 250 is below a predefined threshold, which may be set by the user or by an administrator.

The online interactions between a user and a provider can be influenced or adjusted in other ways based on the Matching Scores 250. For example, in an environment that provides suggested posts, articles, or videos to consume, some embodiments of the present disclosure utilize the Matching Scores 250 at least in part when determining which content to suggest. For example, in an embodiment, a user who's User Profile 220 has a high positive attribute value for the "environment" attribute may have news articles discussing a provider that is highly ethical in the same attribute suggested to them, such as news about a company donating money to rainforest preservation. In this embodiment, a user's suggestions may be adjusted to increase the likelihood that a user will see news about providers' that he or she is likely to like or agree with, which may increase the likelihood that they will deliberately purchase goods or services from that provider in the future.

In a related embodiment, a user may be more likely to be presented with content about a provider with whom he or she disagrees with respect to one or more of the attributes of the User Profile 220. For example, in this embodiment, if a user has a high score in the "people" dimension, they will be more likely to see an article about a business that is accused of running a sweatshop in another country. In this way, the user can learn more about the provider, and may decide to avoid that provider, even offline, or to warn friends about that provider. This embodiment enables users to remain informed about things that they care about.

In some embodiments, the Matching Scores 250 may be provided to the user, enabling the user to make more informed decisions. In such an embodiment, for example, the user may be able to see that the difference between the first result and the tenth result is not very much, and thus the user should not avoid the lower results merely because they are lower. This may prevent, for example, the user from settling for a product or service they do not like as much simply because they believe the provider is much more ethically similar to them. Similarly, the user may determine that even the best provider is still not very closely aligned with themselves, and therefore decide to forgo purchasing the product or service entirely.

In other embodiments, however, the Matching Scores 250 are not provided to the user. In some embodiments, the results are simply sorted with no indication of how closely aligned each company is, other than the order that they are presented in. In other embodiments, the user may be provided with a more overt indication of the Matching Scores 250 (e.g., how closely his principles align with each provider), without giving the actual value. For example, the providers may be sorted into categories ranging from "very closely aligned" to "not at all aligned," and may be colored or highlighted differently. In this embodiment, the user can make informed decisions about each provider, but is not distracted or confused by the actual Matching Scores 250. For example, two providers with high Matching Scores 250 may be sorted into the category of "very closely aligned," but not sorted within that category, so that the user may select among the closely-aligned providers without being influenced by minimal differences in Matching Scores 250 that are not likely to carry much significance.

In an embodiment, a user can request a Matching Score 250 be generated for a specified provider. Such a request may be, for example, because a user has recently read an article about a provider and wants to know more about their principles. Similarly, a user may request information about a specific provider because they are considering purchasing a good or service from that provider. In some embodiments, the user may search for a provider by name, type, location, and the like. In such an embodiment, the system presents a list of providers, sorted according to relevance to the search query, along with information about their respective Matching Scores 250. As discussed above, the Matching Scores 250 may themselves be provided, or the providers may be sorted into various categories without disclosing the actual Matching Score 250. For example, a user may have a friend recommend a particular business for house painting. In the embodiment, the user can enter the name of the painting business in order to see whether they are a good match, before proceeding to purchase any services.

In some embodiments, the user may provide other identifying data in order to retrieve a Matching Score 250. In an embodiment, for example, rather than typing in the name of the provider, the user can take a picture of the storefront of a provider and upload the picture to the system. The picture is then processed to determine the target provider, and appropriate the Matching Score 250 is either retrieved or generated. In another embodiment, the user may scan an optical machine-readable representation of data, such as a barcode or QR code. For example, the user may pick up a can of soup in a supermarket and scan the barcode with a mobile device. In turn, this identifying data is used to determine the manufacturer/distributer of the product, and a Matching Score 250 is returned to the user. In another embodiment, the identifying data includes a URL, such as a website associated with a provider, or an article discussing a provider. For example, a user may, while reading an article or website about a provider, wish to know more. In this embodiment, the user can use the link to the website as identifying data, and receive information about the Matching Score 250 in return. In some embodiments, a link is provided on the page itself that generates a Matching Score 250, so the user does not have to copy and paste or retype the URL.

In other embodiments, any kind of data that can be used to identify a target provider can be used to retrieve a Matching Score 250. For example, a user may provide an offer for a product or service, such as in an email, a picture of the product which can be identified using image recognition, a picture of a flyer or advertisement that can be processed using image recognition, a video or audio recording, and the like.

In some embodiments, a Matching Score 250 is generated in response to receiving a request from the user to complete some action. The action may be, for example, purchasing an item or sharing an article on social media. In some embodiments, the Matching Score 250 for the identified provider is provided to the user prior to completing the specified action. For example, before a user shares an article about a company, he or she may be provided with the Matching Score 250 so that he or she can decide whether to proceed to share the article. In an embodiment, the user is only provided the Matching Score 250 if it is less than a predefined threshold. For example, if a user attempts to purchase an item from an online store, Machine Learning Component 155 may interrupt the request and prompt the user to verify that they wish to proceed with the purchase. In some embodiments Machine Learning Component 155 provides the Matching Score 250 to the user to decide, but in some embodiments the score may be used in other various ways, such as color-coding or sorting into categories, as discussed above. Once the user confirms that they wish to proceed with the purchase despite the low Matching Score 250, the transaction is allowed to be completed.

In a related embodiment, Matching Server 140 could provide a link to a website where the good or service represented by the identifying data can be purchased. For example, if the identifying data is a picture of a product, Matching Server 140 can provide a link to purchase that product from an online retailer, after determining the Matching Score 250 of the associated provider. In some embodiments, if the Matching Score 250 is below a predefined threshold, the Matching Server 140 suggests other related products that are provided by one or more providers who have higher Matching Scores 250 with the user. For example, if a user scans a barcode or takes a picture of the label of a pair of pants, a Matching Score 250 for the associated provider of the pants is generated. If the Matching Score 250 exceeds a predefined threshold, the user can be provided a link to purchase the pants online. If, however, the Matching Score 250 does not exceed a predefined threshold, Matching Server 140 may provide a list of similar pants that are sold by providers with closer Matching Scores 250.

In the illustrated embodiment of FIG. 2, User Documents 205 and Provider Documents 225 may be used to update the User Profile 220 and Provider Profile 240 as well as generate a new profile. In some embodiments, the User and Provider Profiles 220 and 240 are updated as soon as a new, previously unprocessed, electronic document becomes available. For example, as soon as a user posts a new status, his or her User Profile 220 may be updated to reflect any changes in their beliefs that may be evident. Similarly, as soon as a story breaks about scandal involving a provider, the respective Provider Profile 240 may be updated to adjust their scores appropriately.

In another embodiment, the User and Provider Profiles 220 and 240 are not updated immediately upon the publishing of a new document, but rather at a later time. In one embodiment, the User and Provider Profiles 220 and 240 may be updated periodically, e.g., every hour, every day, every week, etc. Advantageously, this reduces the processing resources required by the system. Similarly, an update may be triggered manually by an administrator or a user, or requested by the respective provider.

In some embodiments, a user can provide private documents, such as texts, emails, diaries, and the like to the Trained Machine Learning Model 215 in order to see how their User Profile 220 changes. The use of these private documents may make the User Profile 220 more accurate, because the user is less likely to hide their opinions. In some embodiments, the system may permanently update the User Profile 220 in response to these documents, or may only consider documents that have been made publically available. Further, in some embodiments, the user can request that his or her User Profile 220 be permanently deleted, along with all associated User Documents 205.

In some embodiments, the Provider Profiles 240 are based solely on publically available data. In some embodiments, however, a provider can provide private documents, such as internal memos and emails, meeting minutes, and the like in order to see an updated Provider Profile 240, without allowing those documents to become public. This can help a provider to determine changes that need to be made internally in order to avoid scandal or become more ethical, or prepare a public statement in preparation of a new story that is about to be released.

Figure 3:
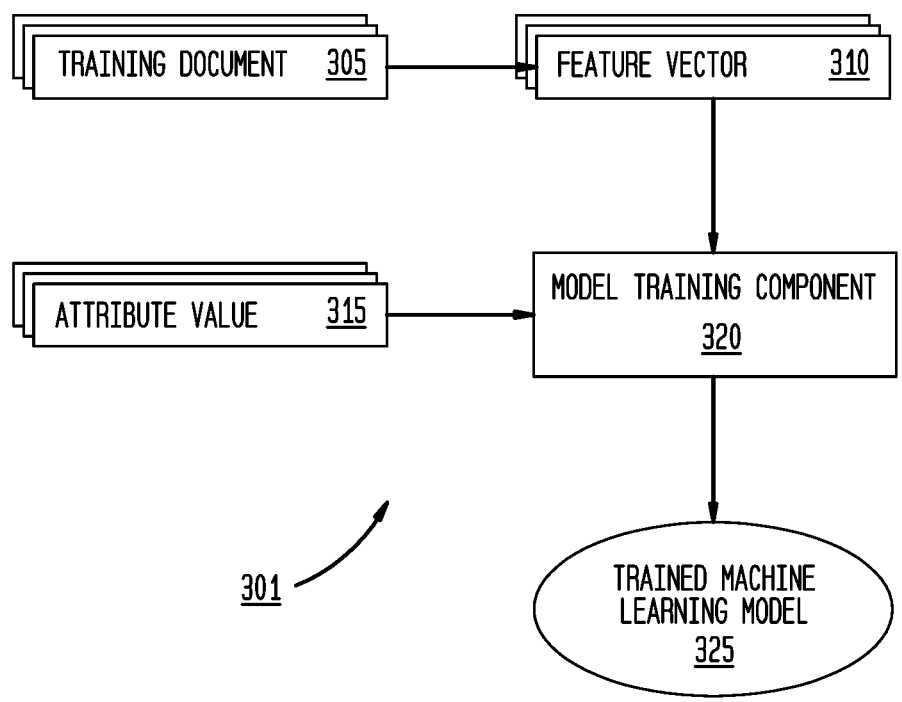
FIG. 3 illustrates a method for creating and maintaining a supervised machine learning model for generating profiles, according to one embodiment of the present disclosure.

FIG. 3 illustrates a method 301 for generating and updating a supervised machine learning model. As used herein, "trained machine learning" is used interchangeably with "supervised machine learning," and generally refers to machine learning that utilizes exemplars and pre-defined attribute scores to train the model. As illustrated, a corpus of Training Documents 305 are converted into Feature Vectors 310. These Feature Vectors 310 are provided to a Model Training Component 320, along with a set of associated Attribute Values 315. That is, each Training Document 305 is associated with one or more Attribute Values 315 for the principle attributes used by the system, wherein each of the one or more Attributes Values 315 represents a measure of an ethical attribute indicated by the corresponding Training Document 305. For example, an article written about a particular provider abstaining from animal testing could indicate a positive score for an animal rights attributes, but could get a neural score for other attributes such as a politics attribute. The Model Training Component 320 uses supervised machine learning techniques to generate and update a Trained Machine Learning Model 325, which can then be used to process new electronic documents. Such techniques may include classification and regression techniques, among others. In this way, an updated model can be maintained that can be used to generate user and provider profiles.

Figure 4:
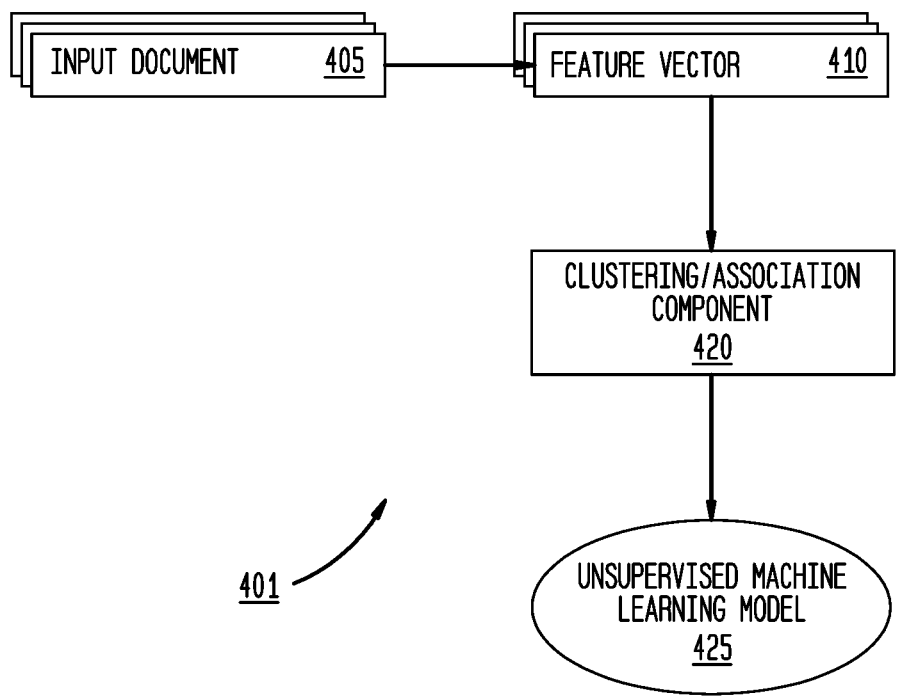
FIG. 4 illustrates a method for creating and maintaining an unsupervised machine learning model for identifying emerging trends, according to one embodiment of the present disclosure.

FIG. 4 illustrates a method 401 for unsupervised machine learning to identify emerging trends or attributes that should be added or removed from the profiles. The techniques may include clustering, association, and other unsupervised machine learning techniques. As illustrated, a plurality of Input Documents 405 are first used to generate Feature Vectors 410, and are provided to Clustering/Association Component 420, which generates an Unsupervised Machine Learning Model 425. This Unsupervised Machine Learning Model 425 can be continuously updated to help detect emerging trends and scandals, for example, through clustering, word maps, and the like. This data can then be used to add or remove attributes from the user and provider profiles.

FIG. 5 is a method 501 for generating user and provider profiles, and influencing online interactions between a provider and the user based on those profiles. The method begins at block 505, where Machine Learning Component 155 generates a user profile specifying a plurality of attribute values for a plurality of principle attributes by processing a corpus of electronic documents associated with a user using a first trained machine learning model, wherein outputs of the first trained machine learning model are combined to generate the plurality of attribute values for the user profile. Additionally, at block 510, Machine Learning Component 155 generates a provider profile specifying a plurality of attribute values for the plurality of principle attributes for each of a plurality of providers, by processing a respective corpus of electronic documents associated with each respective provider using a second trained machine learning model, wherein outputs of the second trained machine learning model are combined to generate the plurality of attribute values for each respective provider profile. Next, at block 515, a plurality of match coefficients are determined based on comparing the user profile and the plurality of provider profiles. At block 520, a plurality of query results are sorted based at least in part on the plurality of match coefficients, wherein each of the plurality of query results is associated with one of the plurality of providers. Finally, at block 525, the sorted plurality of query results are provided to the user, along with at least an indication of the plurality of match coefficients.

FIG. 6 illustrates another method 601 for generating user and provider profiles and influencing online interactions based on comparing the profiles. At block 605, Machine Learning Component 155 generates a user profile specifying a plurality of attribute values for a plurality of principle attributes, by processing a corpus of electronic documents associated with a user using a first trained machine learning model, wherein outputs of the first trained machine learning model are combined to generate the plurality of attribute values for the user profile. At block 610, Machine Learning Component 155 generates a provider profile specifying a plurality of attribute values for the plurality of principle attributes, for each of a plurality of providers, by processing a respective corpus of electronic documents associated with each respective provider using a second trained machine learning model, wherein outputs of the second trained machine learning model are combined to generate the plurality of attribute values for each respective provider profile. The method 601 continues at block 615, where identifying data is received from the user.

Next, at block 620, a target provider of the plurality of providers is determined, wherein the target provider is associated with the identifying data. This can be achieved in a variety of ways, as discussed above. Once the target provider has been identified, the method proceeds to block 625 where a provider profile corresponding to the target provider is retrieved. At block 630, Machine Learning Component 155 determines a match coefficient based on comparing the user profile and the provider profile, wherein the match coefficient describes how closely the provider profile matches the user profile. Finally, at block 635, the Machine Learning Component 155 influences one or more online interactions between the user and the target provider based on the determined match coefficient.

FIG. 7 illustrates a method 701 for generating user and provider profiles, as well as matching scores, according to an embodiment. At block 705, a digital image of a product is received from a user. Next, at block 710, the system determines, based on the digital image, a target provider associated with the product. At block 715, Machine Learning Component 155 generates a user profile specifying a plurality of attribute values for a plurality of principle attributes, by processing a corpus of electronic documents associated with the user using a first trained machine learning model, wherein outputs of the first trained machine learning model are combined to generate the plurality of attribute values for the user profile. Further, at block 720, Machine Learning Component 155 generates a provider profile specifying a plurality of attribute values for the plurality of principle attributes, by processing a corpus of electronic documents associated with the target provider using a second trained machine learning model, wherein outputs of the second trained machine learning model are combined to generate the plurality of attribute values for the target provider profile. At block 725, a match coefficient is determined based on comparing the provider profile to the user profile. Finally, at block 730, the user is provided with at least an indication of the determined match coefficient.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a machine learning or comparison component) or related data available in the cloud. For example, the machine learning system could execute on a computing system in the cloud and generate, store, and compare profiles at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a computer memory storing a program, which, when executed on the processor, performs an operation comprising:
   generating a user profile specifying a plurality of attribute values for a plurality of principle attributes, by processing a corpus of electronic documents associated with a user using a first trained machine learning model, wherein outputs of the first trained machine learning model are combined to generate the plurality of attribute values for the user profile;
   generating a provider profile specifying a plurality of attribute values for the plurality of principle attributes, for each of a plurality of providers, by processing a respective corpus of electronic documents associated with each respective provider using a second trained machine learning model, wherein outputs of the second trained machine learning model are combined to generate the plurality of attribute values for each respective provider profile;
   determining a plurality of match coefficients based on comparing the user profile and the plurality of provider profiles;
   sorting a plurality of query results based at least in part on the plurality of match coefficients, wherein each of the plurality of query results is associated with one of the plurality of providers; and providing the sorted plurality of query results to the user, along with at least an indication of the plurality of match coefficients.

2. The system of claim 1, wherein the corpus of electronic documents associated with the user includes at least one of:
   (i) one or more social media posts created by the user;
   (ii) one or more social media posts shared by the user;
   (iii) one or more blog posts authored by the user;
   (iv) one or more things that the user has expressed a like for;
   (v) one or more things that the user has expressed a dislike of;
   (vi) one or more video recordings that include the user; and
   (vii) one or more audio recordings that include the user.

3. The system of claim 1, wherein each respective corpus of electronic documents associated with each respective provider includes publically available data, including at least one of:
   (i) one or more mission statements of the respective provider;
   (ii) one or more visions of the respective provider;
   (iii) one or more public statements of the respective provider;
   (iv) one or more actions the taken by the respective provider;
   (v) one or more news articles about the respective provider; and
   (vi) one or more social interactions involving the respective provider;
   (vii) one or more statements made by a person associated with the respective provider; and
   (viii) one or more actions taken by a person associated with the respective provider.

4. The system of claim 1, wherein, prior to being processed by the first and second trained machine learning models, each document is pre-processed to facilitate processing by the respective trained machine learning model.

5. The system of claim 4, wherein the pre-processing comprises at least one of: (i) removing stop words from each document, (ii) removing punctuation from each document, and (iii) vectorizing each document.

6. The system of claim 1, wherein the plurality of match coefficients indicate how closely each respective provider's principles align with the user's principles, the operation further comprising:
   determining weighting information for each of the plurality of principle attributes, wherein determining the plurality of match coefficients is further based on the determined weighting information.

7. The system of claim 1, the operation further comprising:
   identifying an emerging trend by processing a corpus of publically available data using an unsupervised machine learning method; and
   adding, to the plurality of principle attributes, a new principle attribute reflecting the identified emerging trend.

8. The system of claim 1, wherein each document in the respective corpus of electronic documents associated with each respective provider is assigned a weight based at least in part on a source of the respective document, and wherein each document in the corpus of electronic documents associated with the user is assigned a weight based at least in part on a type of the respective document.

9. The system of claim 1, the operation further comprising filtering the sorted plurality of providers based at least in part on the plurality of match coefficients.

10. A computer-readable storage medium having computer-readable program code embodied therewith, the computer-readable program code executable by one or more computer processors to perform an operation comprising:
    generating a user profile specifying a plurality of attribute values for a plurality of principle attributes, by processing a corpus of electronic documents associated with a user using a first trained machine learning model, wherein outputs of the first trained machine learning model are combined to generate the plurality of attribute values for the user profile;
    generating a provider profile specifying a plurality of attribute values for the plurality of principle attributes, for each of a plurality of providers, by processing a respective corpus of electronic documents associated with each respective provider using a second trained machine learning model, wherein outputs of the second trained machine learning model are combined to generate the plurality of attribute values for each respective provider profile;
    receiving, from the user, identifying data;
    determining a target provider of the plurality of providers, wherein the target provider is associated with the identifying data;
    retrieving a provider profile corresponding to the target provider,
    determining a match coefficient based on comparing the user profile and the provider profile, wherein the match coefficient describes how closely the provider profile matches the user profile; and
    influencing one or more online interactions between the user and the target provider based on the determined match coefficient.

11. The computer-readable storage medium of claim 10, wherein the corpus of electronic documents associated with the user includes at least one of:
    (i) one or more social media posts created by the user;
    (ii) one or more social media posts shared by the user;
    (iii) one or more blog posts authored by the user;
    (iv) one or more things that the user has expressed a like for;
    (v) one or more things that the user has expressed a dislike of;
    (vi) one or more video recordings that include the user; and
    (vii) one or more audio recordings that include the user.

12. The computer-readable storage medium of claim 10, wherein the corpus of electronic documents associated with the provider includes publically available data, including at least one of:
    (i) one or more mission statements of the provider;
    (ii) one or more visions of the provider;
    (iii) one or more public statements of the provider;
    (iv) one or more actions the taken by the provider;
    (v) one or more news articles about the provider; and
    (vi) one or more social interactions involving the provider;
    (vii) one or more statements made by a person associated with the provider; and
    (viii) one or more actions taken by a person associated with the provider.

13. The computer-readable storage medium of claim 10, wherein, prior to being processed by the first and second trained machine learning models, each document is preprocessed to facilitate processing by the respective trained machine learning model.

14. The computer-readable storage medium of claim 13, wherein the pre-processing comprises at least one of: (i) removing stop words from each document, (ii) removing punctuation from each document, and (iii) vectorizing each document.

15. The computer-readable storage medium of claim 10, wherein the match coefficient indicate how closely the provider's principles align with the user's principles, the operation further comprising:
determining weighting information for each of the plurality of principle attributes, wherein determining the match coefficient is further based on the determined weighting information.

16. The computer-readable storage medium of claim 10, the operation further comprising:
identifying an emerging trend by processing a corpus of publically available data using an unsupervised machine learning method; and
adding, to the plurality of principle attributes, a new principle attribute reflecting the identified emerging trend.

17. The computer-readable storage medium of claim 10, wherein each document in the respective corpus of electronic documents associated with each respective provider is assigned a weight based at least in part on a source of the respective document, and wherein each document in the corpus of electronic documents associated with the user is assigned a weight based at least in part on a type of the respective document.

18. The computer-readable storage medium of claim 10, wherein the identifying data comprises at least one of:
(i) a URL;
(ii) an offer for a product or service;
(iii) a barcode or QR code on a product;
(iv) a picture of a product;
(v) a picture of a flyer or advertisement;
(vi) a picture of a storefront;
(vii) a video recording; and
(viii) an audio recording.

19. The computer-readable storage medium of claim 10, wherein influencing one or more online interactions between the user and the target provider comprises:
upon determining that the match coefficient is less than a predefined threshold, prompting the user to verify that they wish to proceed with a requested action; and
upon receiving confirmation from the user, allowing the requested action to be completed.

20. A method comprising:
receiving, from a user, a digital image of a product;
determining, based on the digital image, a target provider associated with the product;
generating a user profile specifying a plurality of attribute values for a plurality of principle attributes, by processing a corpus of electronic documents associated with the user using a first trained machine learning model, wherein outputs of the first trained machine learning model are combined to generate the plurality of attribute values for the user profile;
generating a provider profile specifying a plurality of attribute values for the plurality of principle attributes, by processing a corpus of electronic documents associated with the target provider using a second trained machine learning model, wherein outputs of the second trained machine learning model are combined to generate the plurality of attribute values for the target provider profile;
determining a match coefficient based on comparing the provider profile to the user profile; and
providing the user with at least an indication of the determined match coefficient.

* * * * *